(12) United States Patent
Roireau et al.

(10) Patent No.: US 11,785,118 B2
(45) Date of Patent: Oct. 10, 2023

(54) SYSTEM AND METHOD FOR DYNAMICALLY DELIVERING CONTENT

(71) Applicant: Castle Hill Holding LLC, Charlottesville, VA (US)

(72) Inventors: Alan Roireau, Charlottesville, VA (US); Forrest Workman, Charlottesville, VA (US)

(73) Assignee: CASTLE HILL HOLDING LLC, Charlottesville, VA (US)

( * ) Notice: Subject to any disclaimer, the term of this patent is extended or adjusted under 35 U.S.C. 154(b) by 219 days.

(21) Appl. No.: 14/977,051

(22) Filed: Dec. 21, 2015

(65) Prior Publication Data

US 2016/0191666 A1 Jun. 30, 2016

Related U.S. Application Data

(60) Provisional application No. 62/096,843, filed on Dec. 24, 2014.

(51) Int. Cl.
| | |
|---|---|
| *H04L 67/63* | (2022.01) |
| *H04L 67/306* | (2022.01) |
| *A63F 13/30* | (2014.01) |
| *A63F 13/213* | (2014.01) |
| *A63F 13/42* | (2014.01) |
| *G07F 17/32* | (2006.01) |
| *G06K 7/14* | (2006.01) |

(52) U.S. Cl.
CPC ............ *H04L 67/63* (2022.05); *A63F 13/213* (2014.09); *A63F 13/30* (2014.09); *A63F 13/42* (2014.09); *G06K 7/1417* (2013.01); *G07F 17/3209* (2013.01); *G07F 17/3225* (2013.01); *H04L 67/306* (2013.01)

(58) Field of Classification Search
CPC ..................................... H04L 67/327
See application file for complete search history.

(56) References Cited

U.S. PATENT DOCUMENTS

| | | |
|---|---|---|
| 8,342,406 B2 | 1/2013 | Saunders et al. |
| 8,667,539 B2 | 3/2014 | Hartson et al. |

(Continued)

FOREIGN PATENT DOCUMENTS

| | | |
|---|---|---|
| AU | 2014202061 A1 | 10/2014 |
| WO | 2013123482 A1 | 8/2013 |

OTHER PUBLICATIONS

European Search Report dated May 4, 2016 for European Application No. EP 15 20 2414.

*Primary Examiner* — Nicholas R Taylor
*Assistant Examiner* — Sm Z Islam
(74) *Attorney, Agent, or Firm* — WORKMAN NYDEGGER

(57) ABSTRACT

A system and method for dynamically delivering content includes a user device having a processor in communication with a capture device and a terminal having a data processor in communication with a display, memory device, and user interface, wherein the terminal is configured to dynamically generate a signal. The user device is configured to interact with the terminal and the capture device is configured to capture the signal and translate the signal to an action. The action includes generating content at the user device and/or downloading or accessing content to the user device.

17 Claims, 9 Drawing Sheets

(56) References Cited

U.S. PATENT DOCUMENTS

| | | | |
|---|---|---|---|
| 2006/0025222 A1* | 2/2006 | Sekine | G07F 17/32 463/42 |
| 2010/0144444 A1* | 6/2010 | Graham | A63F 13/10 463/42 |
| 2012/0187187 A1* | 7/2012 | Duff | G06Q 10/00 235/382 |
| 2013/0032634 A1* | 2/2013 | McKirdy | A61B 5/0205 235/375 |
| 2013/0256403 A1* | 10/2013 | MacKinnon Keith | G06Q 20/42 235/375 |
| 2014/0094276 A1 | 4/2014 | Ward et al. | |
| 2014/0221100 A1* | 8/2014 | Mul | G07F 17/3272 463/42 |
| 2014/0302915 A1* | 10/2014 | Lyons | G07F 17/3237 463/25 |
| 2015/0072767 A1* | 3/2015 | Montenegro | G07F 17/3218 463/31 |
| 2015/0072783 A1* | 3/2015 | Nicely | G07F 17/326 463/31 |

* cited by examiner

SYSTEM AND METHOD FOR DYNAMICALLY DELIVERING CONTENT

CROSS-REFERENCE TO RELATED APPLICATION(S)

The present application claims the benefit of U.S. Provisional Patent Application Ser. No. 62/096,843, filed Dec. 24, 2014, the entire disclosure of which is hereby incorporated by reference.

BACKGROUND OF THE INVENTION

1. Field of the Invention

The present invention relates generally to computer systems and methods for delivering content. More specifically, the present invention is a system and method for dynamically delivering content by generating a signal at a terminal that may be captured by a user device to create or access content at the user device based on activity at the terminal.

2. Description of the Related Art

Advantages of disseminating information electronically are that information may take many different forms including, for example, text, video, sound, or the like, may include interactive features, may be updated more easily than printed or prerecorded information, and may be less expensive to disseminate than physical media such as printed material, CDs, DVDs, or the like.

For example, it is well known in the art to provide static codes, such as quick response ("QR") codes on advertisements, schedules, directories, etc. to provide links to changing information, interactive content, or the like. For example, a movie poster or mall directory may include a QR code that can be captured using a mobile phone camera. The QR code typically provides a link to a website that contains information that can be better provided online due to the interactivity of the information, changing nature of the information, or the like.

The drawback of these codes is that while the information on the website may be updated and interactive, the codes themselves are static and can only direct the user to a single source of information. That is, every person who scans a QR code from a movie poster, for example, is directed to the same website and has access to the same information presented in an unvarying manner.

As a result, there is a need in the art for a system and method to provide content to users that may be updated and interactive. There is also a need in the art for a system and method that enables users to scan a QR code from a movie poster, for example, and delivers content in a dynamic manner. Thus, there is a need in the art for a system and method for dynamically delivering content by generating a signal at a terminal that may be captured by a user device to create or access content at the user device based on activity at the terminal.

SUMMARY OF THE INVENTION

Accordingly, the present invention provides a system and method for dynamically delivering content. The system includes a user device having a processor in communication with a capture device and a terminal having a data processor in communication with a display, memory device, and user interface, wherein the terminal is configured to dynamically generate a signal. The user device is configured to interact with the terminal and the capture device is configured to capture the signal and translate the signal to an action. The action includes generating content at the user device and/or downloading or accessing content to the user device.

In addition, the present invention provides a method for dynamically delivering content including the steps of interacting with a terminal by a user with a user device and dynamically generating a signal at the terminal. The method includes the steps of capturing the signal with a capture device at the user device and translating the signal to an action, and wherein the action includes generating content at the user device and/or downloading or accessing content to the user device.

One advantage of the present invention is that a new system and method for dynamically delivering content is provided. Another advantage of the present invention is that the system and method provides updated and interactive content to a user such that the codes are dynamic and can direct the user to one or more sources of information. Yet another advantage of the present invention is that the system and method dynamically delivers content by generating a signal at a terminal that may be captured by a user device to create or access content at the user device based on activity at the terminal. Still another advantage of the present invention is that the system and method may reconstitute a game from data sent by a user device and record the replay of the game as a movie to output.

Other features and advantages of the present invention will be readily appreciated, as the same becomes better understood, after reading the subsequent description taken in conjunction with the accompanying drawings.

DESCRIPTION OF THE PREFERRED EMBODIMENT(S)

Figure 1:
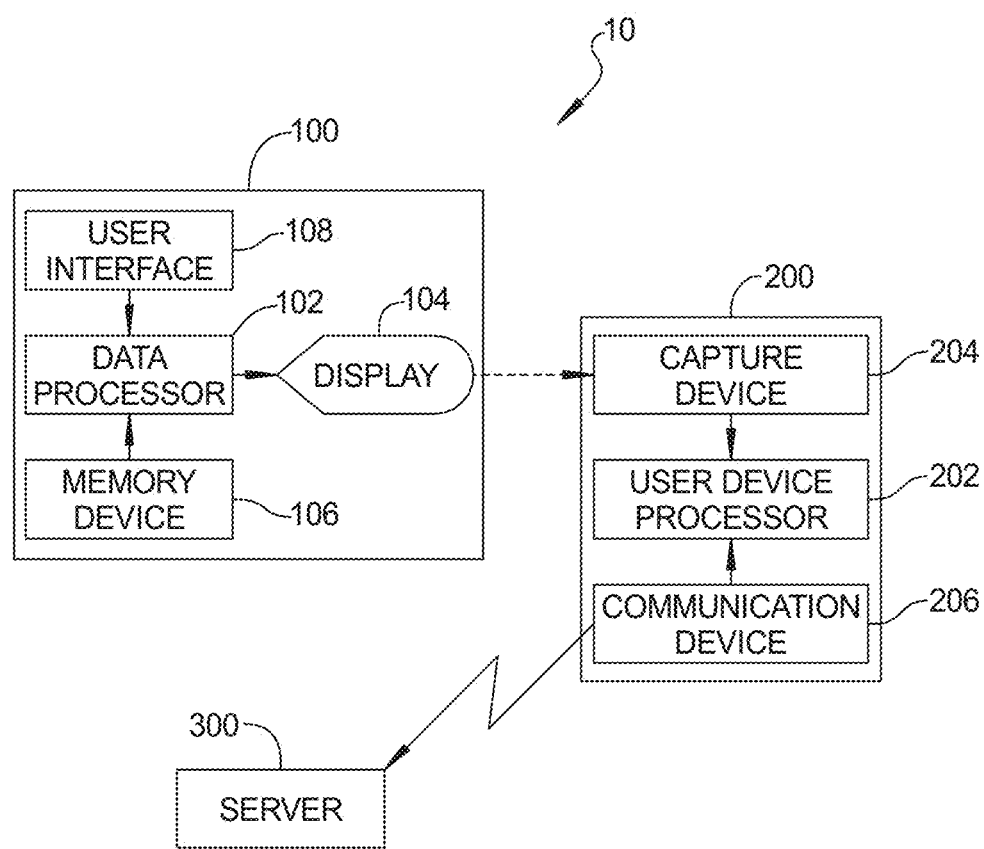
FIG. 1 is a block diagram of a system, according to one embodiment of the present invention.

Referring to the drawings and in particular FIG. 1, one embodiment of a system 10, according to the present invention, for dynamically delivering content to a user device 200 from a terminal 100 that is separate from the user device 200. Generally, the system 10 includes at least one terminal 100. The terminal 100 may take any form, including an electronic gaming machine, a mechanical or electro-mechanical slot machine, kiosk, handheld terminal, personal computer, cellular telephone, tablet computer, or the like. In one embodiment, the terminal 100 includes a data processor 102 in communication with a display 104, a memory device 106, and a user interface 108. It should be appreciated that the terminal 100 is conventional.

The data processor 102 may take any form. For example, in one embodiment, the data processor 102 is a conventional semiconductor data processor. In another embodiment, the terminal 100 may include a plurality of data processors 102. In yet another embodiment, the data processor 102 aids in executing the game by generating random numbers through a hardware, firmware, or software random number generator.

The data processor 102 communicates with the display 104. The form of the display 104 may vary depending on the embodiment. For example, the display 104 could take the form of a liquid crystal display ("LCD"), light emitting diode ("LED") or organic light emitting diode ("OLED") display, cathode ray tube ("CRT") monitor, plasma display, or any other form of display. It should be appreciated that the data processor 102 may communicate directly with the display 104 or via a video controller or other display interface (not shown). It should also be appreciated that the display 104 is conventional and known in the art.

The data processor 102 also communicates with the memory device 106. The memory device 106 may be configured to store program instructions executable by the data processor 102 as well as data files used in executing program instructions, such as graphics files, game parameters, sound files, or the like. The memory device 106 can be any form of computer memory, including optical memory, magnetic memory, electric or electronic memory, flash memory, or the like. It should be appreciated that the memory device 106 is conventional and known in the art.

The data processor 102 communicates with the user interface 108. In various embodiments in which the terminal 100 is a gaming device, the user interface 108 may include a device for receiving input, such as wagers, designations of wagers, player selections, or the like, and a device for dispensing or providing output, such as payouts. In this regard, the user interface 108 may contain a single device or multiple devices. For example, the user interface 108 may include a bill acceptor, ticket or voucher reader, ticket or voucher printer, coin slot, card reader, button panel, or the like. In another embodiment, certain elements of the user interface 108 may be combined with the display 104 into a touch screen device. It should be appreciated that the user interface 108 is conventional and known in the art.

The system 10 also includes a user device 200. The user device 200 includes a user device processor 202 in communication with a capture device 204 and a communication device 206. In one embodiment, the user device 200 may include a display, memory, and the like. However, because these are not essential to carry out a method according to an embodiment of the present invention, they are not illustrated in the figures. As above, the user device processor 202 may take any form and, in one embodiment, includes a conventional semiconductor-based data processor. It should be appreciated the user device processor 202 is conventional and known in the art.

The capture device 204 may optionally have the form of an optical input device, such as a camera, image scanner, laser scanner, or the like. In one embodiment, the capture device 204 may take the form of a conventional digital camera capturing an image using visible light. In other embodiments, the capture device could capture any form of input including other forms of visible or non-visible electromagnetic signals (such as an ultraviolet, infrared, laser, or other camera), sound (such as a voice or sound recognition device), or the like. In another embodiment, the capture device 204 may be configured to capture signals in a variety of different formats, either separately or simultaneously. For example, the user device 200 may be configured to capture images through a camera and/or sound through a microphone. It should be appreciated that the capture device 204 is conventional and known in the art.

The user device 200 also includes a communication device 206. The communication device 206 may use any means to communicate and use any communication protocol. For example, in various embodiments, the communication device 206 may communicate via mobile broadband, WiFi, or the like. It should be appreciated that the communication device 206 is conventional and known in the art.

Figure 3:
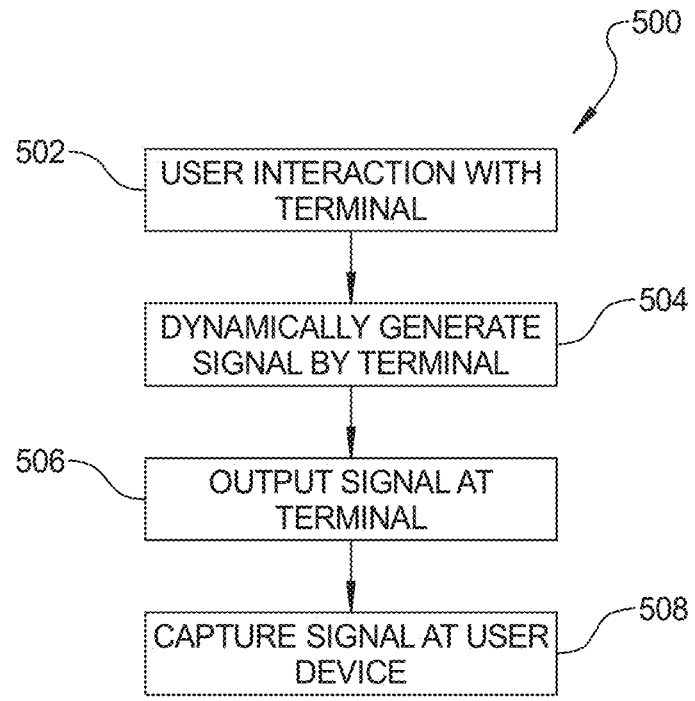
FIGS. 3 and 4 are a flowchart of a method, according to one embodiment of the present invention, used with the system of FIG. 1.
Figure 4:
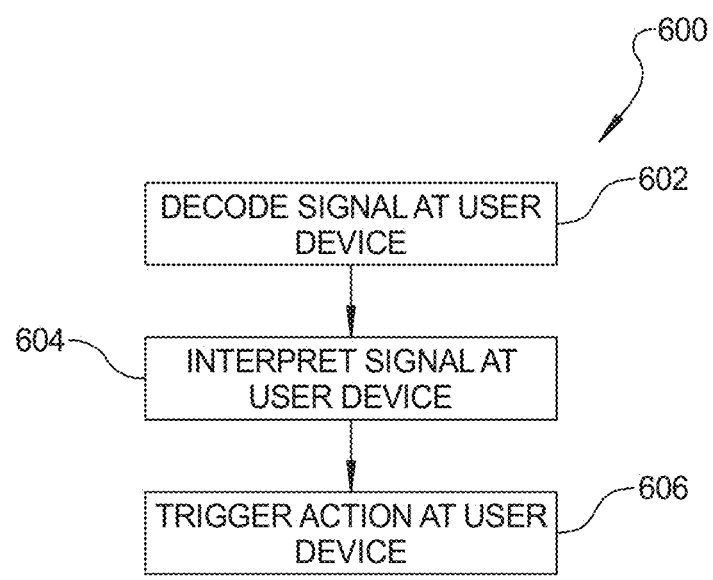

Referring to FIGS. 3 and 4, one embodiment of a method, according to the present invention, for dynamically generating and delivering content it uses with the system 10 of FIG. 1 is shown. As illustrated in FIG. 3, the method 500 at the terminal 100 is shown. The method 500 begins in block 502 and includes the step of the user interacting with the terminal 100. For example, the dynamic generation may be based on the user's interaction with the terminal 100. The method 500 advances to block 504 and includes the step of dynamically generating, with the terminal 100, a signal that can be captured by the capture device 204 of the user device 200. For example, according to one embodiment of the present invention, the terminal 100 is a gaming device that conducts a game. In the embodiment in which the terminal 100 is a gaming device, the method includes the generation of the signal that may occur before a game, during the course of a game, after a game, between games, during an attract sequence while the terminal 100 is idle, or any other time. For example, in one embodiment, the terminal 100 dynamically generates the signal during or after a game based on the conduct and/or outcome of a game. In other embodiments, the terminal 100 may dynamically generate the signal before a game, between games, or during an attract sequence to draw players to begin or continue play of the terminal 100.

The method 500 then advances to block 506 and includes the step of outputting a signal at the terminal 100. The signal may take any form and may be output in any manner and at any time or over time. In one embodiment, the signal is a visible graphic or symbol that is displayed at the display 104 of the terminal 100. In another embodiment, the signal is a visible graphic or symbol that is printed and dispensed via the user interface 108 of the terminal 100. The method 500 advances to block 508 and includes the step of capturing the signal at the user device 200. For example, the signal is readable by the capture device 204 of the user device 200 as the capture device 204 captures an image of the visible graphic or symbol. The graphic/symbol may take any form, including text or character (in any language), static image, animation, symbol code, or the like. It should be appreciated that the symbol code may be one-dimensional (such as a bar code or the like), two-dimensional (such as a data matrix, quick response ("QR") matrix, or the like), or three-dimensional (such as a hologram or the like). It should also be appreciated that the symbol code may be separately visible or may be embedded into an image or text. It should further be appreciated that, for example, the symbol code may be a data glyph embedded into a static image or animation.

While the examples illustrated in the figures describe the signal as a visible signal and the capture device 204 as an imaging device, it should be appreciated that this is illustrative rather than limiting. That is, it is should be appreciated that the signal dynamically generated and output by the terminal 100 could take any form and the capture device 204 could be configured to capture any form of signal, whether visible or non-visible, within the scope of the present invention. It should be appreciated that, as described above, the user device 200 may be configured to capture any of a variety of signals in addition to, or in place of, visible signals, such as non-visible electromagnetic signals (e.g., ultraviolet, infrared, laser, or the like), sound signals (e.g., voice, tone, melody or the like), or the like.

As illustrated in FIG. 4, the method 600 at the user device 200 is shown. The method 600 advances to block 602 and includes the step of decoding the signal. For example, the signal captured by the user device 200 may be decoded 602 by the user device processor 202 or be sent to a separate processor (e.g., server 300 of FIG. 1) which in turn sends the captured signal to a different processor (not shown) to generate the content that is then available and sent back to the user device 200 or terminal 100. In one embodiment, the user device processor 202 decodes the signal by executing software or firmware. The method for decoding the signal may depend on the type of signal. For example, for sound signals, the user device processor 202 may employ sound recognition, voice recognition, or other means for decoding the sound signal. Similarly, in an example directed to visible signals, the user device processor 202 may employ text recognition, character recognition, code recognition, symbol recognition, or the like. In one embodiment in which a visible signal is embedded or interleaved into an image, the decoding method may include locating the code within the image and decoding it.

The method 600 advances to block 604 and includes the step of managing the interpretation of the signal and advances to block 606 and includes the step of triggering an action. In one embodiment, the user device 200 is configured to capture the signal and manage the interpretation of the signal whether on the user device 200 or sent to be accomplished by another processor. For example, the decoded signal is interpreted or translated and an action is triggered at the user device 200 in accordance with the decoded and interpreted signal. The term "action" is intended to include any event that occurs at the user device 200 in response to the signal, including merely displaying or unlocking an option that requires further interaction from the user to utilize. For example, in one embodiment, the decoded signal causes the user device 200 to display a prompt which may be actuated by a user to access content. In another embodiment, the decoded signal provides content to the user device 200 directly. In yet another embodiment, the decoded signal directs the user device 200 to the location of content to be provided to the user device. In one such example, the decoded signal provides a link to content stored on a server 300 (FIG. 1) accessible via Internet or other network. In such an embodiment, the decoded signal is used by the user device processor 202 to access a network via the communication device 206. In one embodiment, the content at the address in the decoded signal may be downloaded to the user device 200 via the communication device 206. In another embodiment, the content at the address in the decoded signal is not downloaded, but is made accessible to the user device 200. It should be appreciated that the content may take any form, including software, text, graphics, animation, sounds, music, or any other type of computer file.

Figure 2:
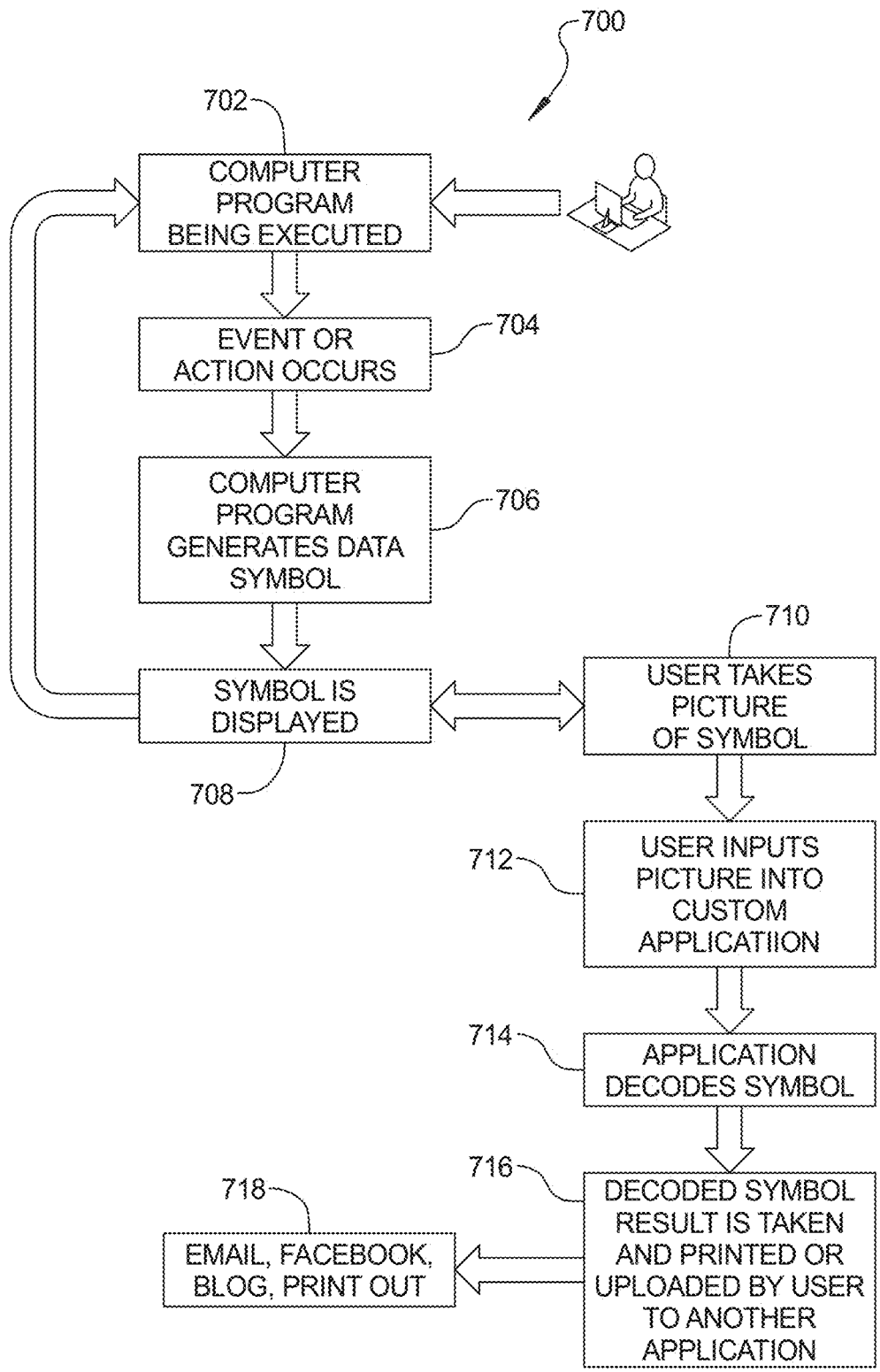
FIG. 2 is a flowchart of a computer program, according to one embodiment of the present invention, used with the system of FIG. 1.

In one embodiment illustrated in FIG. 2, a computer program 700 for the method is shown. The program 700 is executed at block 702 at a terminal 100 by a user. The program 700 advances to block 704 and an event or action occurs in the terminal 100. The program 700 then advances to block 706 and dynamically generates and encodes a symbol or symbols. The symbol(s) could be static or dynamic, e.g., could be a fixed symbol or may be animated. Moreover, the symbol(s) may be based on events happening during conduct of a game program. In another embodiment, the symbol(s) may be random. In one embodiment shown in FIG. 2, the symbol is specifically generated by the program 700 at block 706 based on events occurring in block 704 in the terminal 100. In yet another embodiment, the symbol may be dynamically generated by the program 700 based on interaction by a player or device with the terminal 100.

The program 700 advances to block 708 and the symbol is displayed by the terminal 100. For example, the dynamically-generated symbol is presented by the terminal 100. The program 700 advances to block 710 and the user takes a picture of the symbol. As discussed above, a symbol could be a QR code displayed 708 at the terminal 100, the user device 200 could be a mobile telephone, and the capture device could be a digital camera built into the mobile telephone. In such an embodiment, the symbol could be captured using the mobile phone camera to take a picture of the symbol. The program 700 advances to block 712 and the user inputs the picture into a custom application. The program 700 then advances to block 714 and the application decodes the symbol. For example, the symbol is decoded and interpreted by the user device processor 202 and an action is determined. Thus, in this example, the symbol may be provided as input at block 712 to program instructions executed by the mobile phone. The program 700 could decode at block 714 the symbol and take an action, with the action optionally at the player's discretion. The program or program instructions could be stored in memory at the user device 200 or on a server 300 (FIG. 1) that is remote from the user device 200. In one embodiment, the program instructions perform the reverse of the encoding process used by the terminal 100 and correlate an action using a predefined look-up table or database of symbols and actions.

As discussed above, the results from the analysis are a representation, which could be text, music, graphics, or any combination thereof, whether static or animated. In one embodiment, the action would be pre-defined to illustrate or relate to the player's interaction with the gaming machine terminal 100, with no skill required on the part of the player. As discussed above, the action could result in executing content conveyed directly by the symbol or accessing and/or downloading content at a location identified by the symbol.

The program 700 advances to block 716 and the decoded symbol result is taken and printed or uploaded by the user to another application. In one embodiment, the content may be used by the user device 200 in any manner, including output, transmission, or the like. The program 700 advances to block 718 and output is e-mailed, Facebooked, blogged, or printed out. For example, in one embodiment, the content or other action taken in response to the symbol could be prepared at block 716 for upload and output at block 718 via email, social networking websites, online posts, print out, or the like. In use, the content could be used for electronic tests, game events during or after play on a gaming machine, electronic surveys, web browsing, or the like.

Figure 5:
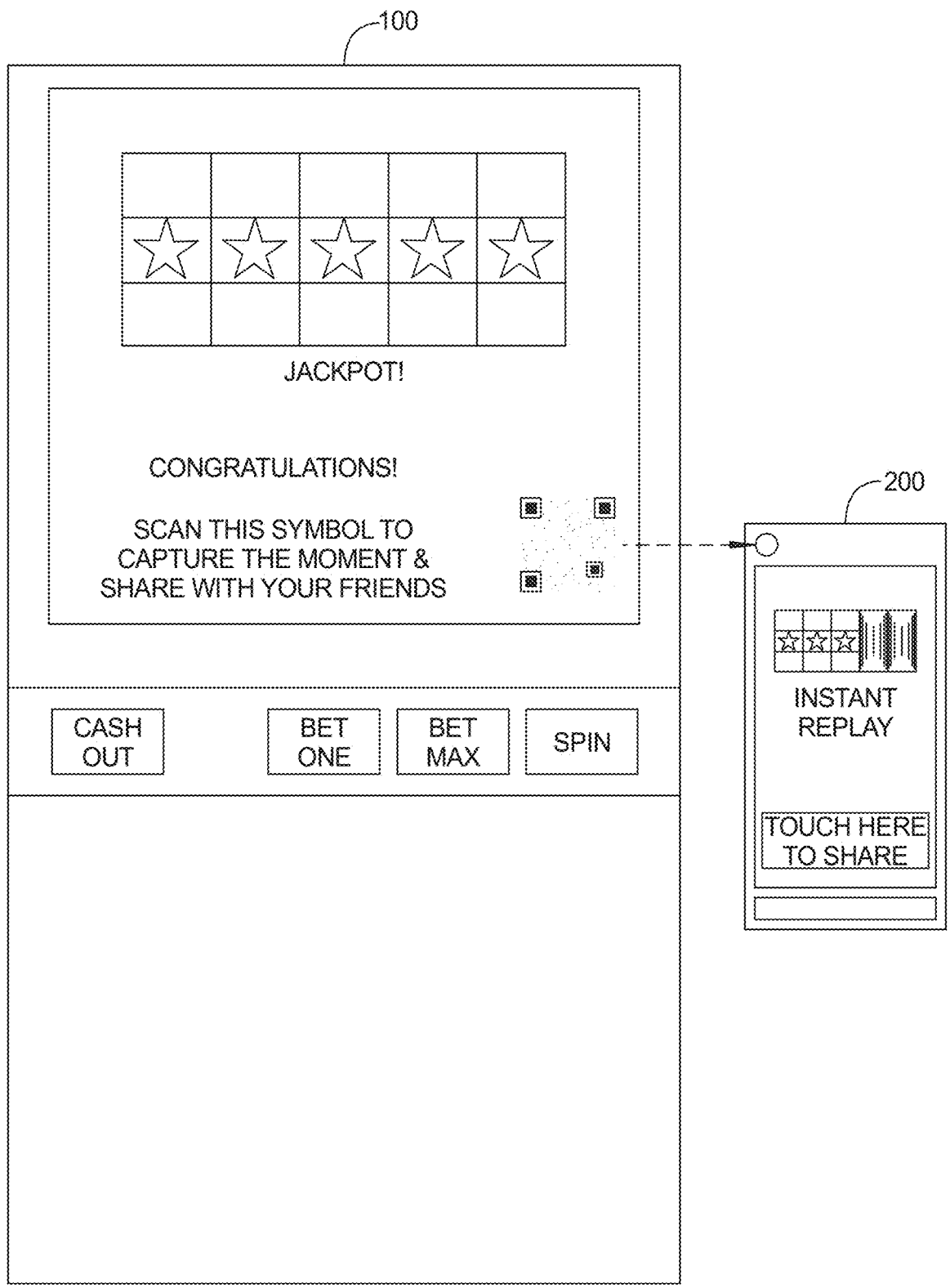
FIG. 5 is a front view of a display, according to one embodiment of the present invention, of the system of FIG. 1.

In one example illustrated in FIG. 5, the terminal 100 may be a slot machine configured to award jackpots. When the jackpot is won by a player, a signal, such as a visible symbol, may be generated. For example, a celebration screen may be displayed with a symbol and instructions to the player to scan the symbol to notify her friends of the jackpot. The player can capture the symbol through the digital camera of the user's mobile phone (e.g., the capture device 204 of her user device 200). The symbol is decoded and correlated to an animation of her celebration win that is stored on the player's mobile phone. The player can then email or otherwise share the animation with her friends.

More specifically, the player configures the terminal 100 via the user interface 108 to select, for example, the quantity of active pay lines and wager per pay line. The game is executed by the terminal 100 and an outcome is generated by the data processor 102. Where the outcome is a jackpot, a screen is generated and displayed at the display 104 to inform the player of the outcome. Program instructions executable by the data processor 102 of the terminal 100 execute to generate a signal, in this case a visible symbol, taking into account the input through the user interface 108. Optionally, the game program outcome and other events in the game program execution may determine the result to be provided and, thus, the symbol to be generated. For example, a plurality of different celebration animations may be available, with different animations configured for different game outcomes and game parameters, and each animation may be correlated to a different symbol. The program instructions may be configured to select a symbol based on the game outcome and game parameters of the completed game, and dynamically generate the selected symbol.

The symbol is output by the terminal 100, such as to the display 104, via a user interface 108, or the like. That is, in one example, the symbol could be displayed on the display 104 and/or printed on a ticket by the user interface 108. If the player chooses to do so, the player can capture the symbol using a digital camera or digital scanner in the user's mobile phone. The captured symbol is then translated by program instructions executed by a user device processor 202 (e.g., a software application which could be executed by the player's mobile phone, personal computer, tablet, or the like). In this example, the translated result is correlated to an action, such as the display or downloading of content, which is then available to the player to use. For example, in one such embodiment, the content may be communicated, posted on a social network transmitted via short message service ("SMS"), or the like. It should be appreciated that the content could range from prewritten text, to a graphic, to a full movie showing the player during a jackpot win.

In another example, a dynamically-generated signal could be presented to poker players in an online poker room. For example, after each hand a player may be able to capture a symbol that displays the previous game. It should be appreciated that, in this embodiment, the display would not alter or change the previous game. It should also be appreciated, rather, it would show a re-creation of what already happened. For example, such a display could be used to show friends or family a re-creation of a game with a notable win or loss (such as a bad-beat).

Specifically, in this example, program instructions may be executed in the background on a poker room server or on the device the player uses to access the poker room. The program instructions dynamically generate a signal (optionally a visible symbol) taking account all player actions and game events (such as which cards were dealt) for a predefined quantity of games. In this example, the symbol is generated for the immediately preceding poker game. At the end of each game, the dynamically-generated symbol for the just-completed game is displayed for all players in the game. The symbol may be captured using a capture device 204 of a user device 200. In this case, the terminal 100 and user device 200 may be the same device (e.g., a phone, tablet, personal computer, or the like that is used to play the game and capture a symbol) or the terminal 100 and user device 200 may be different devices. For example, the symbol may be captured from the display 104 of the terminal 100 (e.g., PC, tablet, or gaming machine) using the capture device 204 (e.g., digital camera) on a separate user device 200 (e.g., mobile phone), or may be captured from the display 104 of the terminal 100 (e.g., tablet, PC, gaming machine, or mobile phone) which also functions as the user device 200 by dragging the symbol to a software application operating on the terminal 100/user device 200.

The symbol could be interpreted by program instructions executed by the user device processor 202 to re-create the last hand or access a re-creation of the last hand that has been stored. It should be appreciated that the re-creation may include a representation of all the actions in the hand, in order of occurrence. In a further embodiment, the re-creation may be configured to display the game in a format similar to that used on television broadcasts of poker games. The content (i.e., the re-creation of the hand) may be available to the player for transmission, posting, or the like.

It should be appreciated that the present invention may not be limited to casino-type gaming but may also be applied to testing and entertainment games. For example, in one embodiment, the terminal 100 may be used to administer a test. At the conclusion of the test, the terminal 100 dynamically generates a signal, such as an animated or static symbol, that can be captured by the user device 200. In one example, the student uses the digital camera of the user's mobile phone to capture the symbol. The symbol is interpreted using program instructions in the form of a software application executed by the user device processor 202. In one embodiment, the symbol may serve to provide the student with immediate or near-immediate feedback and, optionally, test results. For example, in one embodiment, the content provided by the symbol may include a test score, pass/fail outcome, analysis and graphs of the student's answers and results, or the like. In one embodiment, the software application may use the information conveyed by the symbol to directly generate the content or may access the content from a server via a network.

Figure 6:
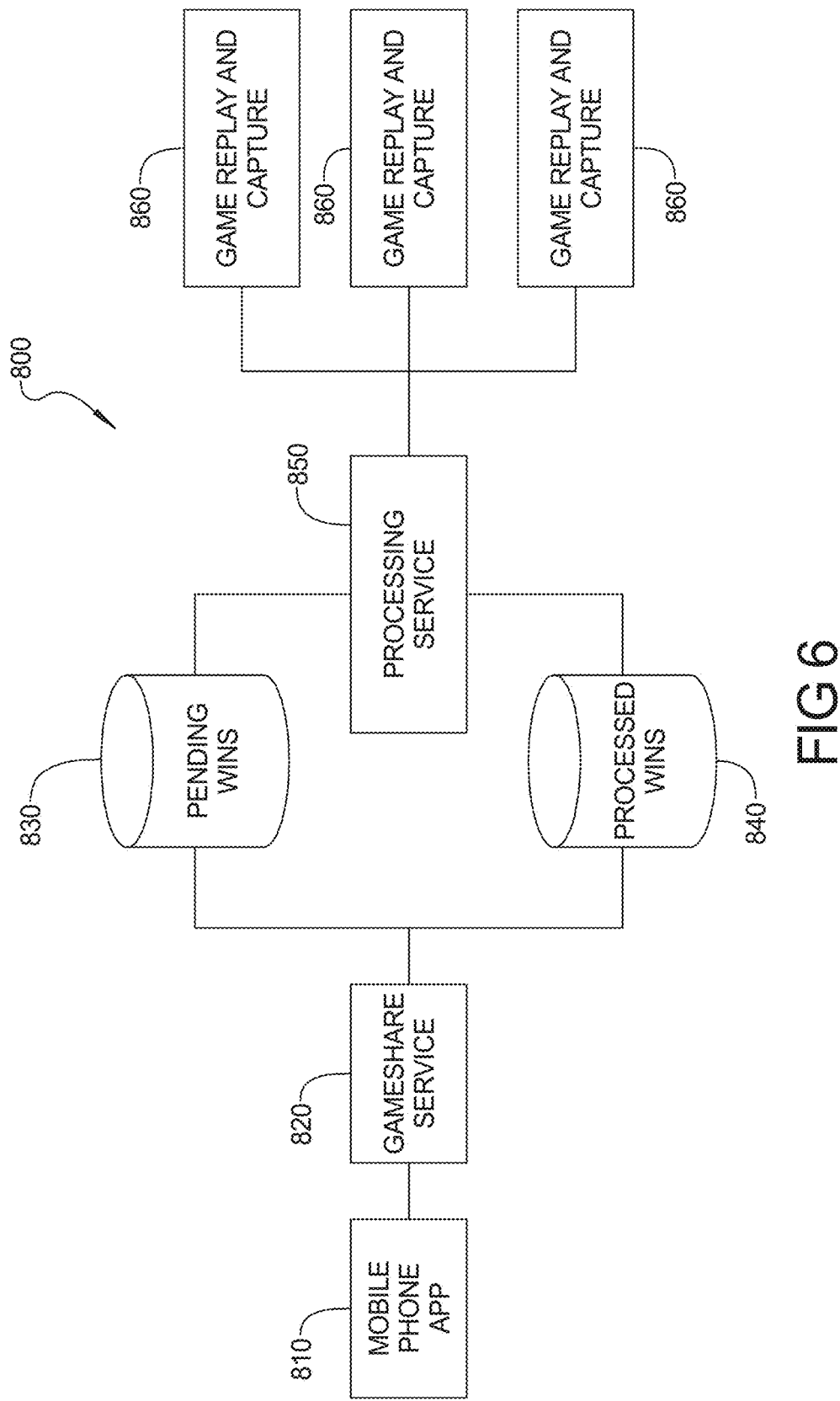
FIG. 6 is a block diagram of a system, according to another embodiment of the present invention.
Figure 8:
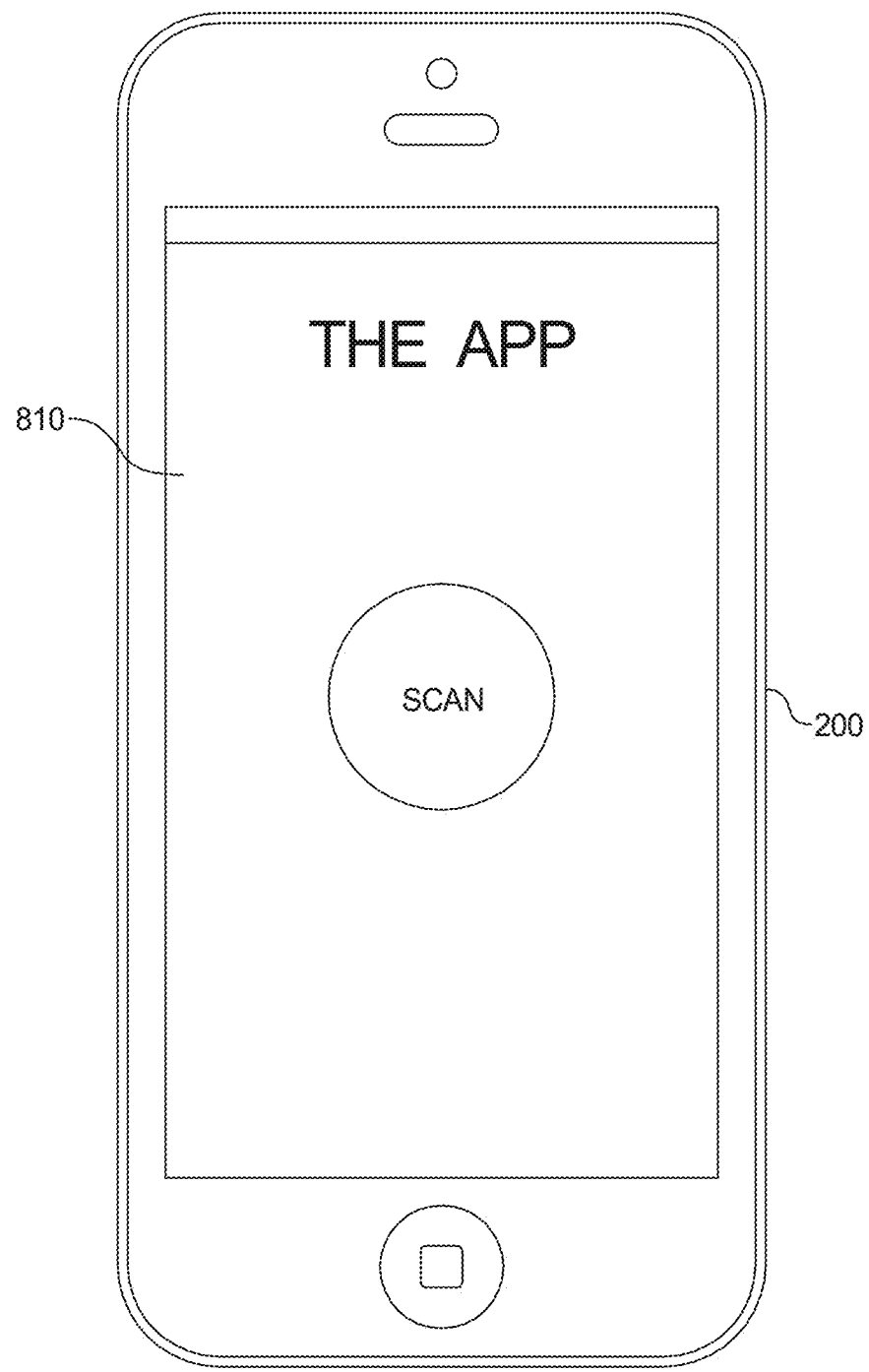
FIGS. 8-10 are screenshots of a user device using the method of FIG. 7.

Referring to FIG. 6, another embodiment of a system such as a game processing system 800, according to the present invention, is shown. The processing system 800 includes a user interface such as a mobile or phone software application or "app" 810 on the user device 200 as illustrated in FIG. 8 and a GameShare service 820 on the server 300 as illustrated in FIG. 1. The service 820 is used by the app 810 to make requests to create replays of a game. The system 800 includes a pending win message queue 830 and a processed win message queue 840. The pending win and processed win message queues 830 and 840, respectively, hold information about pending and processed requests. The system 10 further includes one or more processing services 850 and one or more outputs 860 of game replay and capture. It should be appreciated that the processing service 850 processes the pending wins and outputs the game replays and the capture or recording of those replays.

In one embodiment, the service 820 takes in requests from the app 810 to create win replays of games. These requests may include one or more of the following: the game name; casino name; game type; denomination; amount won; and the data needed to replay the win. Once the service 820 has this information, the service 820 will create a unique ticket identification "id" for the request. It should be appreciated that the service 820 will put the request in the pending win message queue 830 and return the ticket to the app 810.

In one embodiment, there are two message queues 830 and 840 that are used by the processing system 800. The first queue is the pending win queue 830. The pending win queue 830 is where all new requests for replay of games are stored. When the processing service 850 wants to see if there are any new wins to process, the processing service 850 looks into the pending win queue 830 and pulls them off for processing. This allows for multiple processing services 850 to operate or run. The second queue is the processed win queue 840. The processed win queue 840 is where the processing service 850 puts all of the win requests that the processing service 850 has completed processing on. It should be appreciated that the service 820 or another service will then poll the processed win queue 840 to see what wins are ready to be sent back to the app 810 that requested it.

In one embodiment, the processing service 850 takes the pending win requests and starts up a replay of the game based on the information stored in that request. The processing service 850 then starts recording this replay in a medium such as Mp4 or similar format. Once recorded, the replay file is sent to an external service such as YouTube and a processed win message is added to the processed queue.

Figure 7:
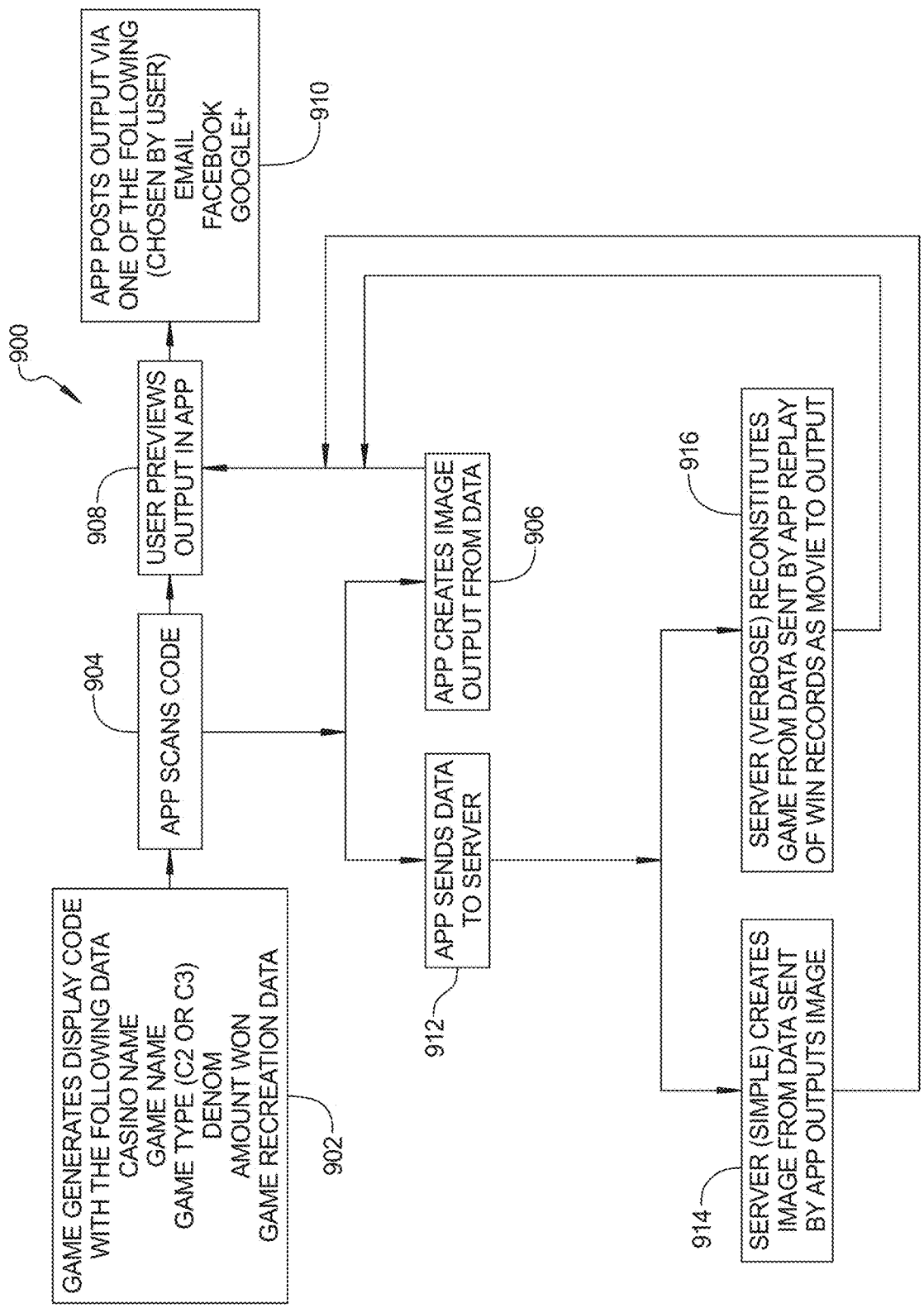
FIG. 7 is a flowchart of a method, according to another embodiment of the present invention, used with the system of FIG. 6.

Referring to FIG. 7, another embodiment of a method, according to the present invention, is shown at 900. In this embodiment, the method 900 begins in block 902 and includes the step of generating a game display code with one or more of the following data: casino name; game name; game type (e.g. Class 2 or Class 3); denomination; amount won; and game recreation data. The method advances to block 904 and includes the step of scanning the game display code with the app 810. In one embodiment, the method advances to block 906 and includes the step of creating image output from the data of the scanned code by the app 810. The method then advances to block 908 and includes the step of previewing the output in the app 810 by the user. The method advances to block 910 and includes the step of outputting the output by the app 810. For example, the output could be saved to the user device 200 only or saved as a movie file on a personal computer or sent over a network via social media or at least one of the following chosen by the user: Email, Facebook, Google+, etc. The method then ends. It should be appreciated that the step of creating the image with the app 810 could be removed if a server such as the server 300 of FIG. 1 is used.

In another embodiment, after block 904, the method advances to block 912 and sends data from the scanned code by the app 810 to a server such as the server 300 of FIG. 1 for processing. In one embodiment, the method advances to block 914 and creates an image from data sent by the app 810 and outputs the image. For example, the server 300 creates an image output based on the code sent and the server 300 sends output back to the app 810 for previewing in block 908 as previously described.

In still another embodiment, after block 912, the method advances to block 916 and reconstitutes the game from data sent by the app 810 and records the replay of the game win as a movie or animation to output. For example, the server 300 adds data to code that describes how to replicate whole game play, the server 300 recreates the game play based on the code, the server 300 records replicated game play as a movie or animation, and the server 300 sends the movie back to the app 810 (same as sending image output) for previewing in block 908 as previously described.

Figure 9:
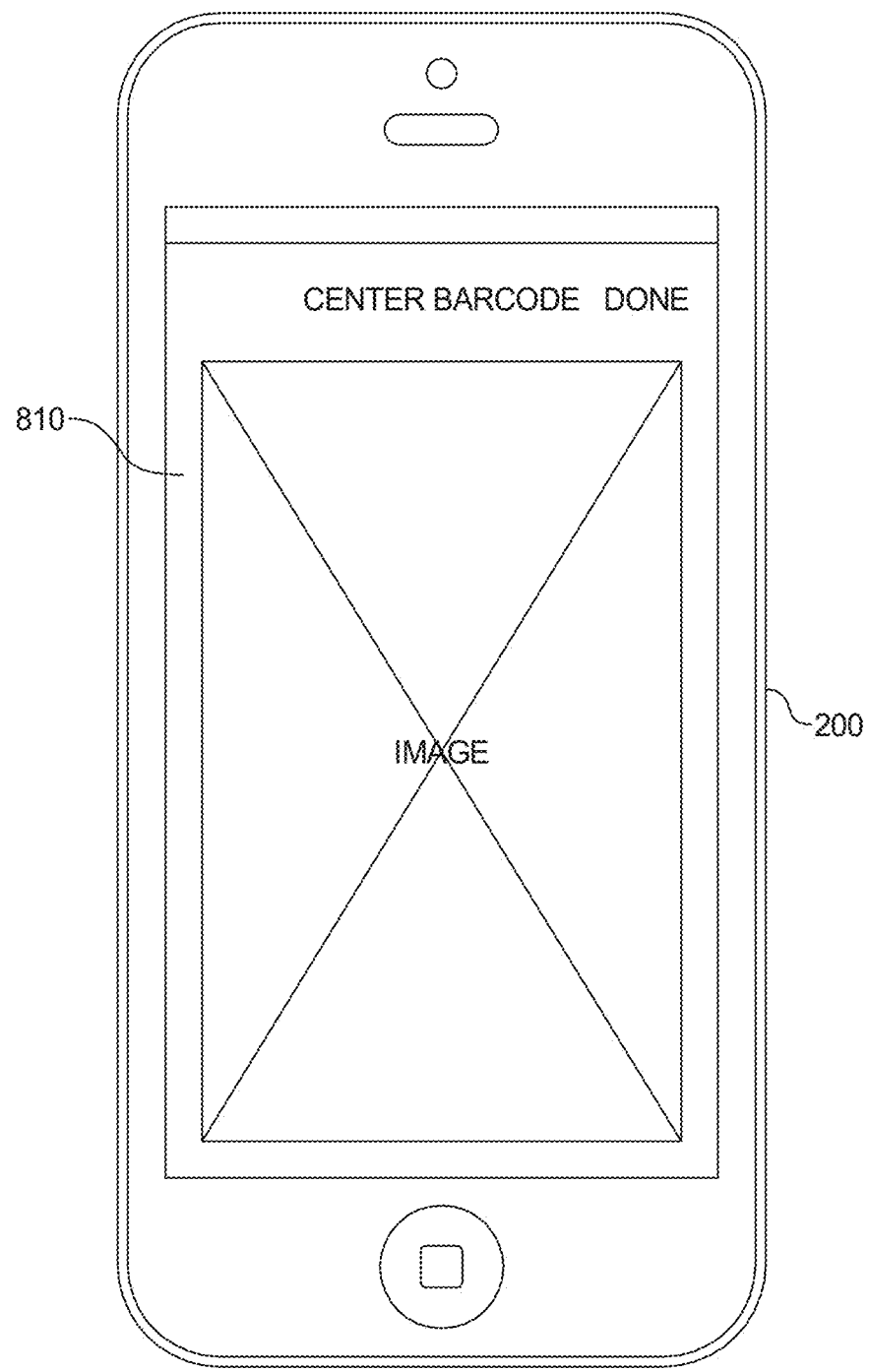
Figure 10:
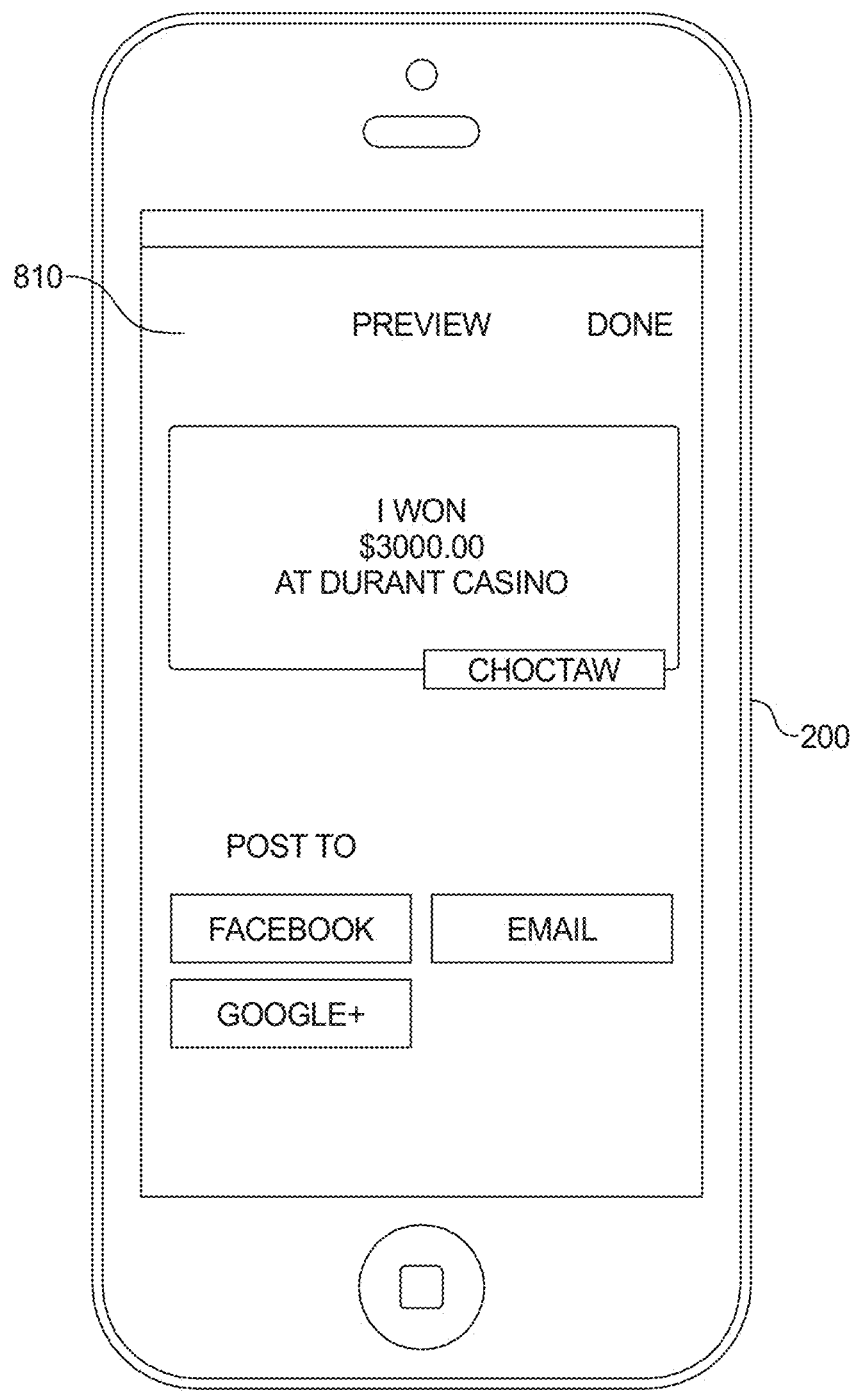

In one embodiment, the app 810 on the user device 200 is used to scan information as illustrated by the screenshot in FIG. 8. For example, the app 810 scans information such as a game display code off of a gaming machine such as the terminal 100 in FIG. 5. The information includes data of one or more of the following: casino name; game name; game type (class 2 or class 3); amount won; denomination; etc. In one embodiment, the app 810 centers an image such as a display code or barcode and scans the image as illustrated by the screenshot in FIG. 9. For example, the app 810 is used to automatically scan the code once the image is in the center of the scan area. In one embodiment, the app 810 is used to preview output and post output as illustrated by the screenshot in FIG. 10. For example, the app 810 parses data and creates an image with the casino name, game name, amount won, and content from game and allows the user to preview output and to post output to Email, Facebook, Google+, etc.

The present invention has been described in an illustrative manner. It is to be understood that the terminology, which has been used, is intended to be in the nature of words of description rather than of limitation.

Many modifications and variations of the present invention are possible in light of the above teachings. Therefore, the present invention may be practiced other than as specifically described.

What is claimed is:

1. A system for dynamically delivering content comprising:
   a user device including a processor in communication with a capture device;
   a gaming terminal including a data processor in communication with a display, memory device, and user interface, wherein the gaming terminal is configured to dynamically generate content based on input through the user interface of the gaming terminal, using the data processor, and to dynamically generate a signal corresponding to the dynamically generated content; and
   a pending wins queue communicating with a game share service;
   wherein the user device is configured to interact with the gaming terminal and the capture device of the user device is configured to capture the signal, the user device translating the signal to an action;
   wherein the action includes generating the dynamically generated content of the terminal at the user device and/or downloading or accessing the dynamically generated content of the gaming terminal to the user device; and
   wherein the dynamically generated content includes a recreation of interactions of the user with the gaming terminal and a video of the user interacting with the gaming terminal.

2. The system as set forth in claim 1, wherein the dynamically generated content includes text, images, sounds, or combinations thereof representative of the input through the user interface.

3. The system as set forth in claim 1, including an application on the user device.

4. The system as set forth in claim 3, including the game share service communicating with the application.

5. The system as set forth in claim 1, including a processed wins queue communicating with the game share service.

6. The system as set forth in claim 5, including a processing service communicating with the pending wins queue and the processed wins queue.

7. The system as set forth in claim 6, including a game replay and capture communicating with the processing service.

8. A method for dynamically delivering content, said method comprising the steps of:

dynamically generating content at a gaming terminal based on interactions with the gaming terminal by a user, said user having a user device;

dynamically generating a signal at the gaming terminal;

capturing the signal with a capture device at the user device; and translating the signal to an action;

wherein a pending wins queue is provided for communicating with a game share service;

wherein the action includes generating the dynamically generated content of the gaming terminal at the user device and/or downloading or accessing the dynamically generated content of the gaming terminal to the user device; and wherein the dynamically generated content includes a recreation of interactions of the user with the gaming terminal and a video of the user interacting with the gaming terminal.

9. The method as set forth in claim 8, including the step of outputting the signal at the gaming terminal.

10. The method as set forth in claim 9, including the step of interpreting the signal at the user device.

11. The method as set forth in claim 10, including the step of triggering the action at the user device.

12. The method as set forth in claim 8, including the step of dynamically generating the content as including a record of the interactions of the user with the gaming terminal and generating the signal as a display code representative of the dynamically generated content.

13. The method as set forth in claim 12, including the step of creating an image output from data of the display code with the user device.

14. The method as set forth in claim 13, including the step of previewing the output by the user with the user device.

15. The method as set forth in claim 14, including the step of outputting the output with the user device.

16. The method as set forth in claim 12, including the step of reconstituting a game from data sent by the user device and recording the reconstituted game as a movie or animation to output at the user device.

17. A method for dynamically delivering content, said method comprising the steps of:

dynamically generating content at a gaming terminal based on interactions with the gaming terminal by a user, said user having a user device;

dynamically generating a signal at the gaming terminal;

capturing the signal with a capture device at the user device; and translating the signal to an action;

wherein a pending wins queue is provided for communicating with a game share service;

wherein the action includes generating the dynamically generated content of the gaming terminal at the user device and/or downloading or accessing the dynamically generated content of the gaming terminal to the user device; and wherein the dynamically generated content includes one of a plurality of predefined animations, a selection of the predefined animation from the plurality of predefined animations being determined based on a game outcome and game parameters of a completed game at the gaming terminal.

* * * * *